(12) United States Patent
Tang et al.

(10) Patent No.: US 8,695,363 B2
(45) Date of Patent: Apr. 15, 2014

(54) THERMAL ENERGY MANAGEMENT SYSTEM AND METHOD

(75) Inventors: Ching-Jen Tang, Watervilet, NY (US);
William Dwight Gerstler, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 407 days.

(21) Appl. No.: 13/071,123

(22) Filed: Mar. 24, 2011

(65) Prior Publication Data

US 2012/0240605 A1 Sep. 27, 2012

(51) Int. Cl.
*F25B 15/00* (2006.01)

(52) U.S. Cl.
USPC .............................................. 62/101; 62/476

(58) Field of Classification Search
USPC .................... 62/101, 476, 178, 434, 495, 489
See application file for complete search history.

(56) References Cited

U.S. PATENT DOCUMENTS

| | | | | | |
|---|---|---|---|---|---|
| 3,831,397 | A | * | 8/1974 | Mamiya | 62/476 |
| 4,342,422 | A | * | 8/1982 | Davis | 237/19 |
| 4,509,959 | A | * | 4/1985 | McCombs | 96/115 |
| 4,551,991 | A | * | 11/1985 | Miyoshi et al. | 62/476 |
| 6,370,893 | B1 | | 4/2002 | Gupte et al. | |
| 6,581,405 | B2 | * | 6/2003 | Kim et al. | 62/476 |
| 7,343,746 | B2 | * | 3/2008 | Pierson | 60/772 |
| 2010/0205981 | A1 | | 8/2010 | Bolin | |
| 2010/0275629 | A1 | | 11/2010 | Erickson | |
| 2010/0281899 | A1 | | 11/2010 | Garrabrant | |

FOREIGN PATENT DOCUMENTS

WO WO2009070090 A8 6/2009

* cited by examiner

*Primary Examiner* — Mohammad M Ali
(74) *Attorney, Agent, or Firm* — Mary Louise Stanford

(57) ABSTRACT

A system, such as a thermal energy management system, is provided. The system can include an absorption module and an evaporation module. The absorption module can include at least two absorption chambers, each absorption chamber being configured to receive liquid absorbent. The evaporation module can be in independent selective fluid communication with each of the absorption chambers, and can be configured to receive and cause therein evaporation of a refrigerant.

20 Claims, 9 Drawing Sheets

THERMAL ENERGY MANAGEMENT SYSTEM AND METHOD

STATEMENT REGARDING FEDERALLY SPONSORED RESEARCH & DEVELOPMENT

This invention was made with Government support under contract number W909MY10C0003 awarded by the United States Army. The Government has certain rights in the invention.

BACKGROUND

In the U.S., conditioning of indoor environments is responsible for about 40% of all energy consumption, and for about 65% of all electricity consumption. Much of this conditioning involves space cooling. As such, efficient space cooling systems are desirable. Conventional methods of space cooling include absorption-based space cooling systems. However, the efficiency of absorption-based space cooling systems may be reduced when operating in a relatively warm ambient environment, and for this reason, the use of absorption-based space cooling systems may be limited.

BRIEF DESCRIPTION

In one aspect, a system, such as a thermal energy management system, is provided. The system can include an absorption module and an evaporation module. The absorption module can include at least two absorption chambers, each absorption chamber being configured to receive liquid absorbent (e.g., including one or more of LiBr, LiCl, LiClO$_3$, CaCl$_2$, ZnCl$_2$, HnBr, and H$_2$SO$_4$). In some embodiments, the absorption module can be configured such that at least one of the absorption chambers is configured to selectively receive liquid absorbent while another of the absorption chambers is selectively prevented from receiving liquid absorbent.

The evaporation module can be in independent selective fluid communication with each of the absorption chambers, and can be configured to receive and cause therein evaporation of a refrigerant. In some embodiments, the evaporation module can include multiple evaporation chambers, and each of the absorption chambers can be in selective independent fluid communication with a respective evaporation chamber.

In some embodiments, the system may include a desorption module configured to exchange liquid absorbent with the absorption module. A condenser may be configured to receive refrigerant from the desorption module and to output refrigerant to be received by the evaporation module.

In some embodiments, the absorption chambers can be configured to receive liquid absorbent that includes at least a solution of an absorbent and the refrigerant. The system can include a refrigerant storage module in fluid communication with the evaporation module and configured to store the refrigerant. The evaporation and absorption modules can be configured such that refrigerant can selectively flow from the evaporation module to a first of the absorption chambers to combine with the liquid absorbent. Simultaneously, flow of the refrigerant from the evaporation module to a second of the absorption chambers can be selectively prevented to cause crystallization of the absorbent in the second of the absorption chambers and storage of a corresponding portion of the refrigerant in the refrigerant storage module. Flow of the refrigerant to the second absorption chamber can be selectively provided to cause the crystallized absorbent to decrystallize.

In another aspect, a method is provided. The method can include providing a system including an absorption module including at least two absorption chambers and an evaporation module in independent selective fluid communication with each of the absorption chambers. Absorbent can be flowed into the at least two absorption chambers. Refrigerant can be evaporated in the evaporation module. During a first interval, the evaporated refrigerant can be allowed to flow to a first of the absorption chambers and prevented from flowing to a second of the absorption chambers to cause absorbent to crystallise in the second of the absorption chambers. During a second interval subsequent to the first interval, evaporated refrigerant can be allowed to flow to the second of the absorption chambers to cause the absorbent to decrystallize.

In yet another aspect, a system, such as a thermal energy management system, is provided. The system can include an absorption module having at least two absorption chambers, with each absorption chamber being configured to receive a liquid absorbent. An evaporation module can be in independent selective fluid communication with each of the absorption chambers, the evaporation module being configured to receive and cause therein evaporation of a refrigerant.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
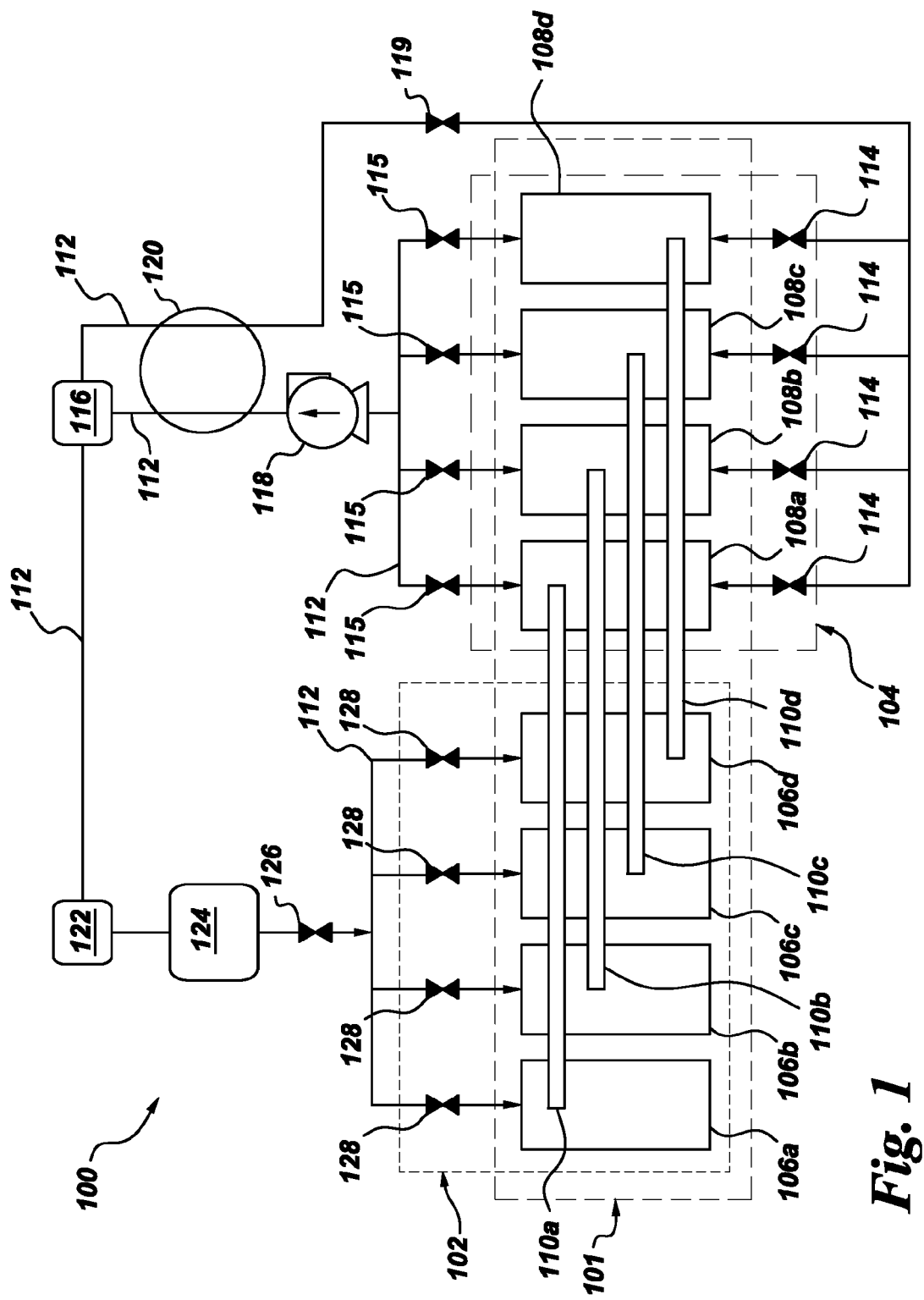
FIG. 1 is a schematic view of thermal energy management system configured in accordance with an example embodiment.

Example embodiments are described below in detail with reference to the accompanying drawings, where the same reference numerals denote the same parts throughout the drawings. Some of these embodiments may address the above and other needs.

Referring to FIG. 1, therein is shown a system, such as a thermal energy management system 100. The thermal energy management system 100 can include an absorption system 101 that has an evaporation module 102 and an absorption module 104. The evaporation module 102 can be configured to receive and cause therein evaporation of a fluid (referred to as "refrigerant"). For example, the evaporation module 102 can include multiple evaporation chambers 106a-d that are each configured to receive liquid refrigerant. The evaporation chambers 106a-d can facilitate the transfer of thermal energy to the liquid refrigerant to cause evaporation of the refrigerant. The properties and function of the refrigerant are discussed in more detail below. The thermal energy transferred to the liquid refrigerant at the evaporation chambers 106a-d, for example, may be heat from room air (cooling effect to the room), solar in origin and/or may be generated by industrial processes (such as exhaust heat from combustion-based processes and/or gas turbines).

The absorption module 104 can include at least two (in the illustrated embodiment, four) absorption chambers 108*a-d*, and the evaporation module 102 can be in independent selective fluid communication with each of the absorption chambers. For example, each evaporation chambers 106*a-d* can be connected to a respective absorption chamber 108*a-d* via absorption conduits 110*a-d*. The function of the absorption chambers 108*a-d* is discussed below.

The thermal energy management system 100 can include a network of conduits 112 for directing fluid flow. As discussed below, during operation of the thermal energy management system 100, the conduits 112 can carry one or both of absorbent and refrigerant (depending on where within the system a specific conduit is located). Each of the absorption chambers 108 can be configured to selectively receive liquid absorbent, which absorbent may be, for example, in combination (e.g., in solution) with liquid refrigerant (absorbent and/or refrigerant in vapor phase may also be received by the absorption chambers). Valves 114, 115 may be included and individually controlled to selectively allow or prevent flow through each of the absorption chambers 108. Each of the absorption chambers 108 can also be configured to facilitate the rejection of thermal energy from absorbent-refrigerant solution contained therein.

The thermal energy management system 100 can also include a desorption module 116 that is configured to exchange liquid absorbent with the absorption module 104. The desorption module 116 can be configured to receive from the absorption module 104 liquid absorbent, say, combined with refrigerant. A pump 118 may be included to urge the absorbent-refrigerant combination to circulate between the desorption module 116 and the absorption module 104. The desorption module 116 can be configured to facilitate thermal energy transfer to the absorbent/refrigerant combination to cause evaporation of at least some of the refrigerant. A valve 119 can be included between the desorption module 116 and the absorption module 104 to allow fluid passing therethrough to be throttled to a lower pressure. In some embodiments, the valve 119 can be excluded, and the valves 114 can act to reduce the pressure of fluid passing from the desorption module 116 to the absorption module 104. A heat exchanger 120 can be included to allow thermal energy to be passed between the combined absorbent/refrigerant flowing from the absorption module 104 to the desorption module 116 and the combined absorbent/refrigerant flowing from the desorption module to the absorption module.

The system 100 can also include a condenser 122, the condenser being configured to receive refrigerant (e.g., in vapor phase) from the desorption module 116. The condenser 122 can be further configured to facilitate transfer of thermal energy from the refrigerant to cause condensation of the refrigerant, and to output the (condensed) refrigerant so as to be received by the evaporation module 102. A refrigerant storage module 124 can be in fluid communication with the evaporation module 102, e.g., disposed between and in fluid communication with the condenser 122 and the evaporation module. The storage module 124 (e.g., a storage tank) can be configured to store refrigerant outputted by the condenser 122, which refrigerant can subsequently be outputted by the storage module, throttled to lower pressure through a valve 126, and selectively supplied to the evaporation chambers 106 of the evaporation module 102 via the conduits 112 and the valves 128. In some embodiments, the valve 126 can be excluded, and the valves 128 can act to reduce the pressure of fluid passing from the storage module 124 to the evaporation module 102.

Operation of the system 100 is now described with reference to FIGS. 1 and 2. Combined (e.g., a solution of) absorbent-refrigerant 130, can be discharged from the absorption chambers 108 and urged toward the desorption module 116 by the pump 118. At the desorption module 116, thermal energy can be transferred to the absorbent-refrigerant solution 130 to cause refrigerant to evaporate, thereby producing a concentrated absorbent-refrigerant solution 132 (the less-concentrated absorbent-refrigerant solution also being referred to as a "diluted absorbent-refrigerant solution"). The concentrated absorbent-refrigerant solution 132 can be throttled through the valve 119 to a lower pressure and directed to the absorption chambers 108 via the valves 114. In order to increase the overall efficiency of the system 100, both the concentrated and diluted absorbent-refrigerant solutions 132, 130 can be passed through the heat exchanger 120 to allow thermal energy to be transferred from the concentrated solution to the diluted solution.

Refrigerant 134, now separated from the absorbent-refrigerant solution 130 by the evaporation process facilitated by the desorption module 116, can flow from the desorption module to the condenser 122. At the condenser 122, thermal energy can be removed from the refrigerant 134 to cause the refrigerant to condense. The condensed refrigerant 134 can then flow into the storage module 124, from where it can flow to and be throttled through the valve 126, thereafter being selectively supplied to each of the evaporation module 102 via the valves 128.

At the evaporation module 102, the evaporation chambers 106 can facilitate the transfer of thermal energy to the refrigerant 134 to cause evaporation of the refrigerant. The evaporated refrigerant 134 therefore accepts thermal energy and converts that thermal energy into latent heat of evaporation. The evaporated refrigerant 134 can propagate from each evaporation chamber 106*a-d* to a respective absorption chamber 108*a-d* via the conduits 110*a-d*, where at least some of the vapor phase refrigerant can be combined with the concentrated absorbent-refrigerant solution 132, thereby forming the diluted absorbent-refrigerant solution 130.

The absorbent and refrigerant may be chosen such that the act of combining the evaporated refrigerant 134 and the concentrated absorbent-refrigerant solution 132 causes a release of thermal energy. For example, the absorber 104 can be configured to combine evaporated refrigerant 134 and concentrated absorbent-refrigerant solution 132 so as to cause at least some evaporated refrigerant to become liquid, thereby causing a release of the latent heat of evaporation associated with the vapor. In some embodiments, the absorbent may be configured to form a liquid solution with the refrigerant, such that when vapor phase refrigerant 134 comes into contact with the concentrated absorbent-refrigerant solution 132, the refrigerant tends to transform into a liquid component of the liquid solution with the absorbent, thereby causing a release of the heat of absorption. In other embodiments, a chemical reaction may occur between the vapor phase refrigerant 134 and the concentrated absorbent-refrigerant solution 132, which reaction may be exothermic and/or may induce a transformation of the evaporated refrigerant to a liquid, thereby releasing heat of reaction and/or latent heat.

As refrigerant 134 evaporates in the evaporation module 102 to form vapor phase refrigerant, thermal energy is absorbed. As the vapor phase refrigerant 134 moves through the conduits 110 and is combined in the absorption module 104 with the concentrated absorbent-refrigerant solution 132, thermal energy in the form of latent heat of evaporation and/or absorption can be released (as well as heat produced by any exothermic chemical reactions that may take place between the first and second working fluids). The overall result is a thermal energy transfer from the evaporation module 102 to the absorption module 104, and the absorption system 101 can be thought of as a heat pump.

The absorbent and refrigerant can be chosen such that, when received at the absorption module 104 (under appropriate conditions), an equilibrium partial pressure of vapor phase refrigerant 134 in the evaporation module 102 is greater than a partial pressure of vapor phase refrigerant in absorption chambers 108a-d with which the evaporation module is in communication. For example, the absorbent and refrigerant can be chosen such that the absorbent (or the concentrated absorbent-refrigerant solution 132) has a strong affinity for the refrigerant. In such a case, the equilibrium partial pressure of vapor phase refrigerant 134 in the vicinity of the concentrated absorbent-refrigerant solution 132 will tend to be low relative, say, to the partial pressure expected in the vicinity of liquid refrigerant. The difference in partial pressures of vapor phase refrigerant 134 in the evaporation module 102 and the absorption chambers 108 results in a driving force for diffusion of vapor phase refrigerant from the evaporation module 102 to the absorption chambers 108. Examples of refrigerant-absorbent pairs that may be utilized in conjunction with embodiments of the above described system 100 include, but are not limited to, water and lithium bromide; $NH_3$ and water; water and LiCl; water and $LiClO_3$; water and $CaCl_2$, water and $ZnCl_2$; water and HnBr; water and $H_2SO_4$; and $SO_2$ and organic solvents. For each refrigerant-absorbent pair including water as the refrigerant, the absorbent may include an aqueous solution of the listed composition.

Overall, the system 100 may operate so as to form a continuous cycle in which refrigerant 134 is caused to evaporate at the evaporation module 102, combines with the concentrated absorbent-refrigerant solution 132 at the absorption module 104, and then is separated from the diluted absorbent-refrigerant solution 130 at the desorption module 116 to allow refrigerant and diluted absorbent-refrigerant solution to repeat the cycle, thereby affecting a transfer of thermal energy from the evaporation module 102 to the absorption module 104. This will be referred to as the "heat-pumping mode" of operation of the system 100. As discussed below, the system 100 can also be operated so as to store energy (referred to as "energy storage mode" of operation) that can be subsequently retrieved and utilised to drive thermal energy transfer. The system 100 may be configured to selectively operate in heat-pumping mode, in energy storage mode, or simultaneously in heat-pumping mode and energy storage mode.

Figure 2:
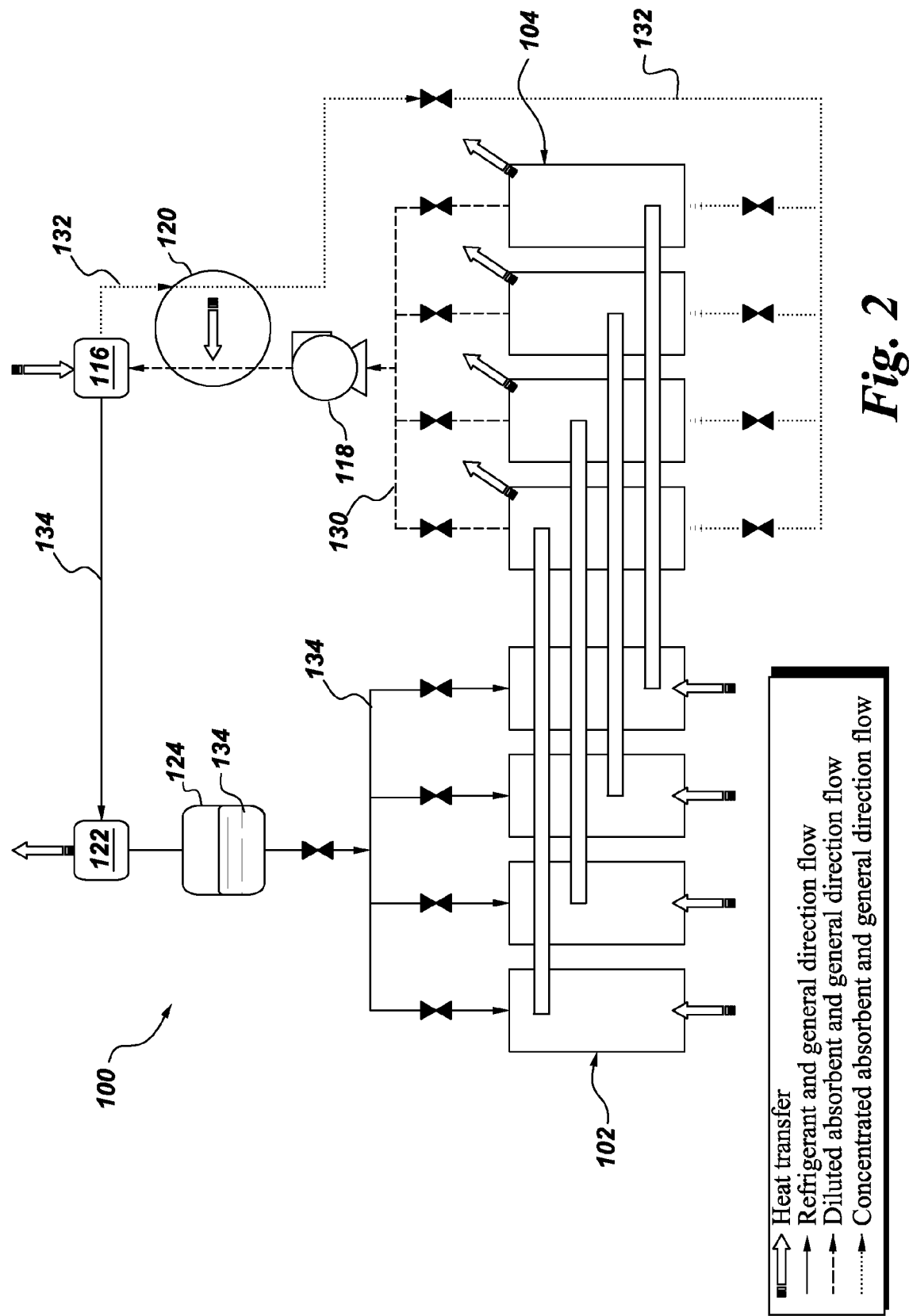
FIG. 2 is a schematic view, during operation, of the thermal energy management system of FIG. 1.
Figure 3:
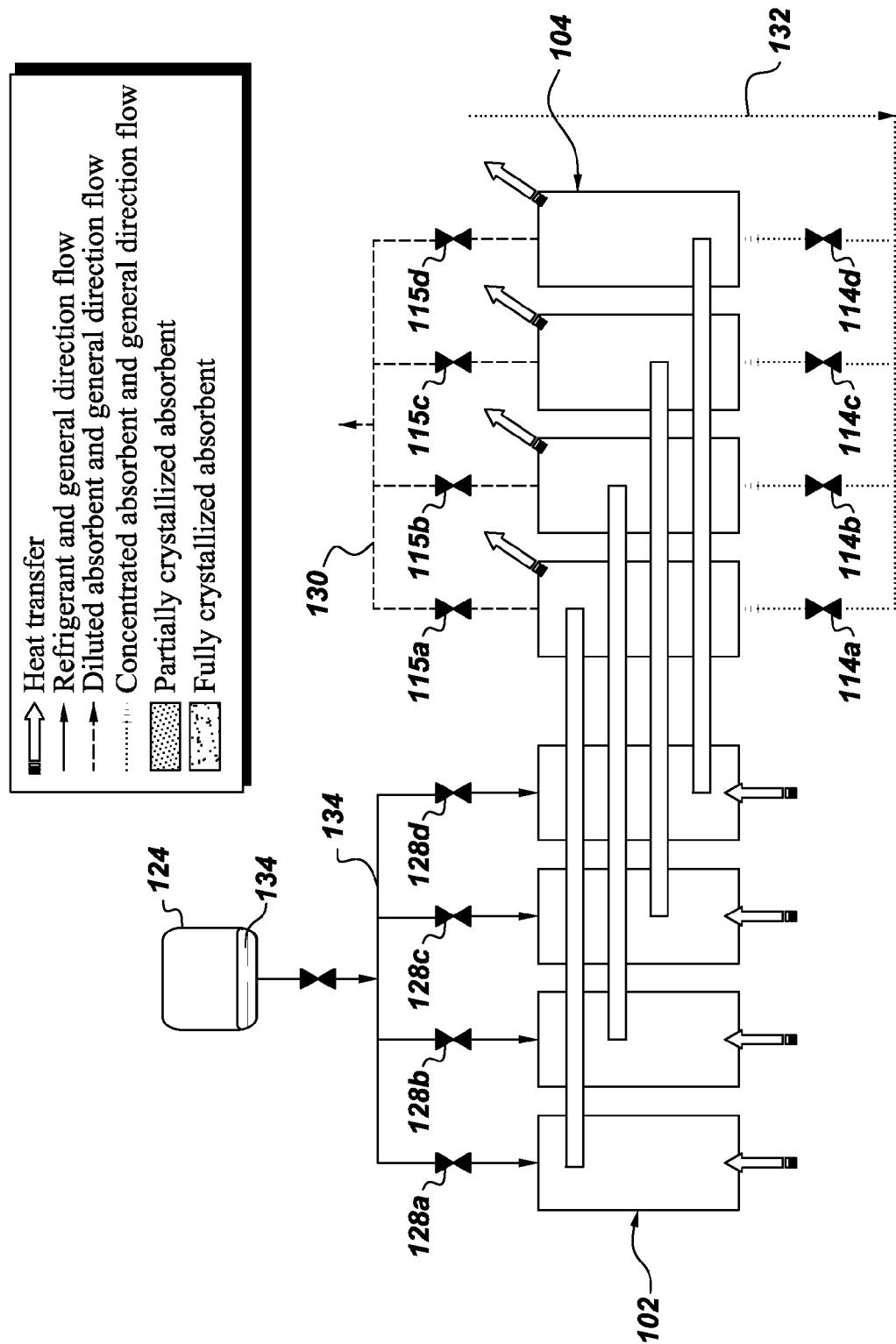
FIGS. 3-8 are schematic views of a portion of the thermal energy management system of FIG. 2 depicting various stages of operation of the system.

Referring to FIGS. 1-8, the system 100 may at an initial time be operating as described above, that is, in purely heat-pumping mode (this situation is depicted in FIGS. 2 and 3). Subsequently, a valve 128a can be closed to prevent the flow of refrigerant 134 to one of the evaporation chambers 106a (referred to as the "first evaporation chamber"); flow may continue to the remaining evaporation chambers 106b-d (see FIG. 4). Evaporation of the refrigerant 134 therefore only occurs in the evaporation chambers to which refrigerant is supplied (in the figure, chambers 106b-d), and evaporated refrigerant is not supplied to the absorption chamber 108a (referred to as the "first absorption chamber") associated with the non-operative evaporation chamber 106a; evaporated refrigerant continues to be supplied to the remaining absorption chambers 108b-d. The first evaporation and absorption chambers 106a, 108a can now be referred to as operating in energy storage mode.

With the flow of evaporated refrigerant 134 halted to the first absorption chamber 108a, the temperature of the concentrated absorbent-refrigerant solution 132 in residence in the first absorption chamber 108a tends to decrease. The absorbent composition and concentration in the concentrated absorbent-refrigerant solution 132 can be chosen such that the temperature decrease of the concentrated absorbent-refrigerant solution induces crystallization of the absorbent. For example, in one embodiment, the absorbent-refrigerant solution 130, 132 can include lithium bromide and water, and upon leaving the desorption module 116, the concentrated absorbent-refrigerant solution 132 can have a concentration of 66.5% lithium bromide (by weight). For such a solution, crystallization of the lithium bromide will tend to initiate when temperature is at or below about 71° C. (the crystallization temperature being relatively insensitive to pressure). In order to allow the concentrated absorbent-refrigerant solution 132 sufficient time in residence in the first absorption chamber 108a to experience the temperature decrease necessary for crystallization, the valves 114a, 115a can be closed, thereby preventing flow through the first absorption chamber.

Figure 4:
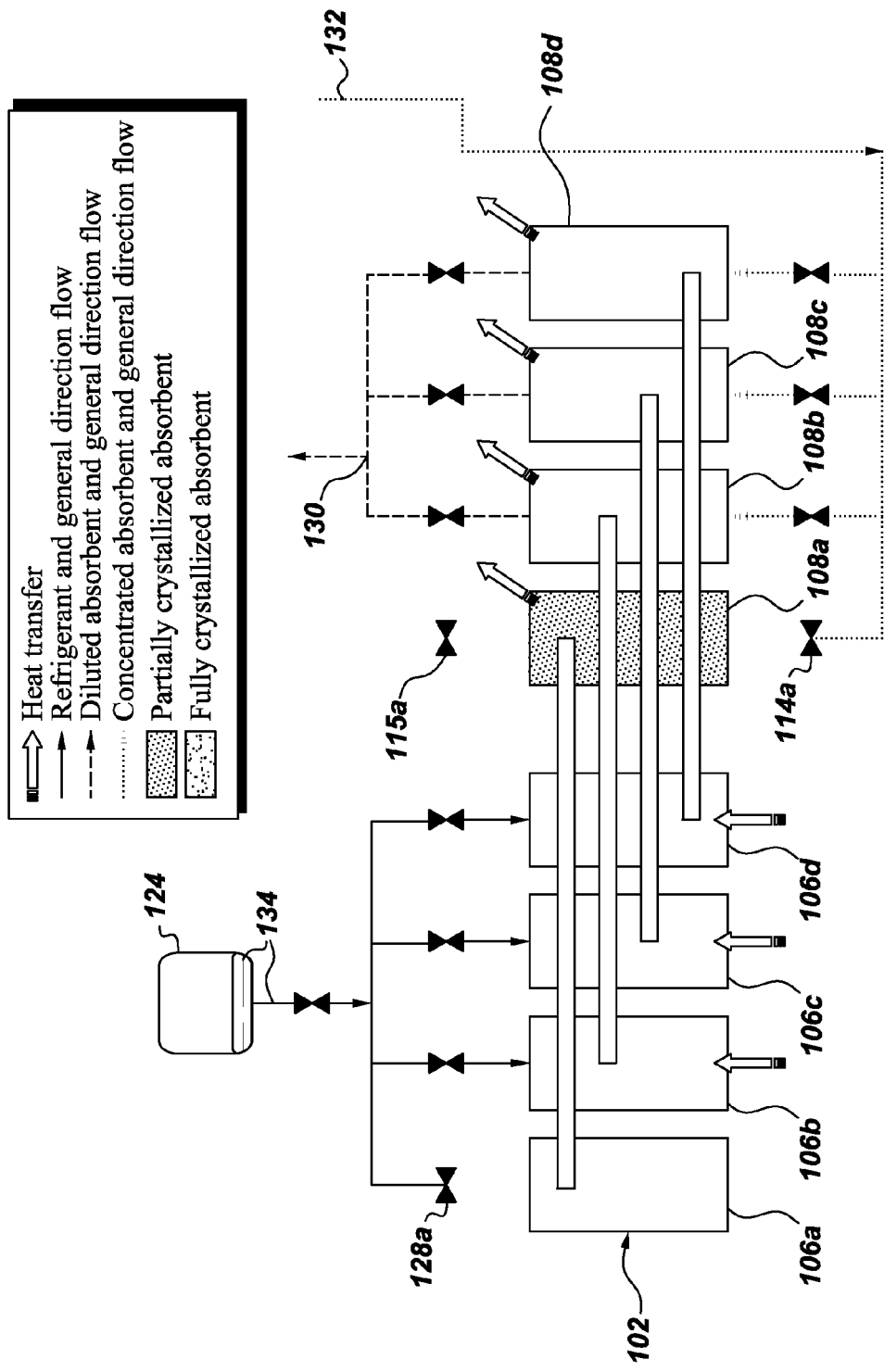
Figure 5:
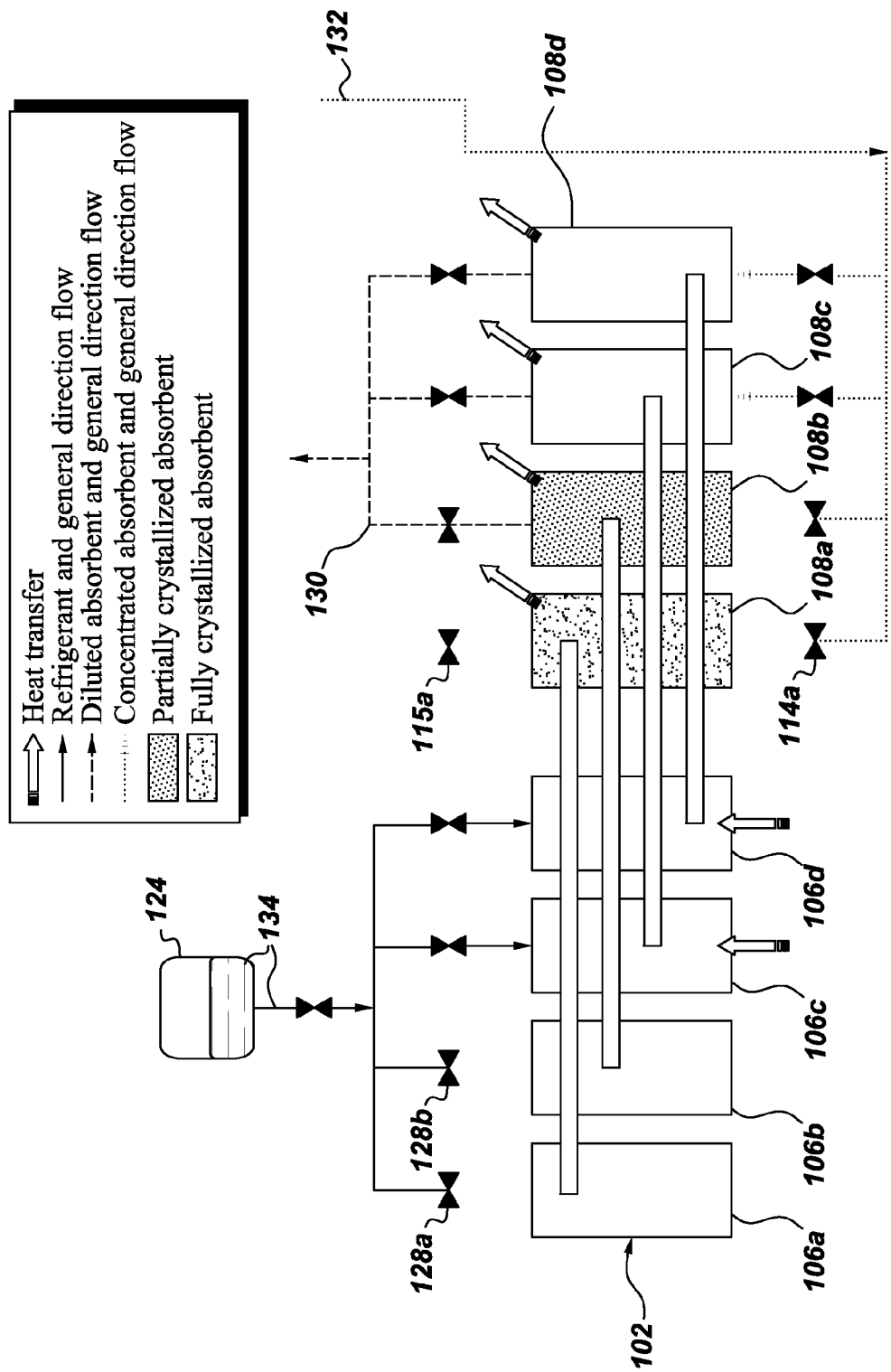

As thermal energy continues to be rejected by the partially crystallized absorbent, crystallization of the absorbent progresses (see FIG. 4). Also, as crystallization proceeds, corresponding portions of refrigerant 134 (that is, refrigerant quantities sufficient to dissolve the now crystallized absorbent) can be stored in the storage module 124. Eventually, crystallization of the absorbent 136 is complete, with a corresponding amount of refrigerant being stored in the storage module 124. The separation of refrigerant from the crystallized absorbent serves to store energy in the form of a chemical potential.

At any time, energy storage mode of operation can be initiated for other evaporation and absorption chamber pairs. For example, the valves 114b, 115b, 128b can be closed to initiate energy storage mode operation for the evaporation chamber 106b (the "second evaporation chamber") and absorption chamber 108b (the "second absorption chamber") (see FIG. 5). Crystallisation of the absorbent is thereby induced in the second absorption chamber 108b, with a corresponding amount of refrigerant 134 being stored in the storage module 124. It is noted that, for evaporation and absorption chambers 106, 108 that are not operating in energy storage mode, these chambers can continue to operate in heat-pumping mode (for example, simultaneously with other chambers operating in energy storage mode).

Figure 6:
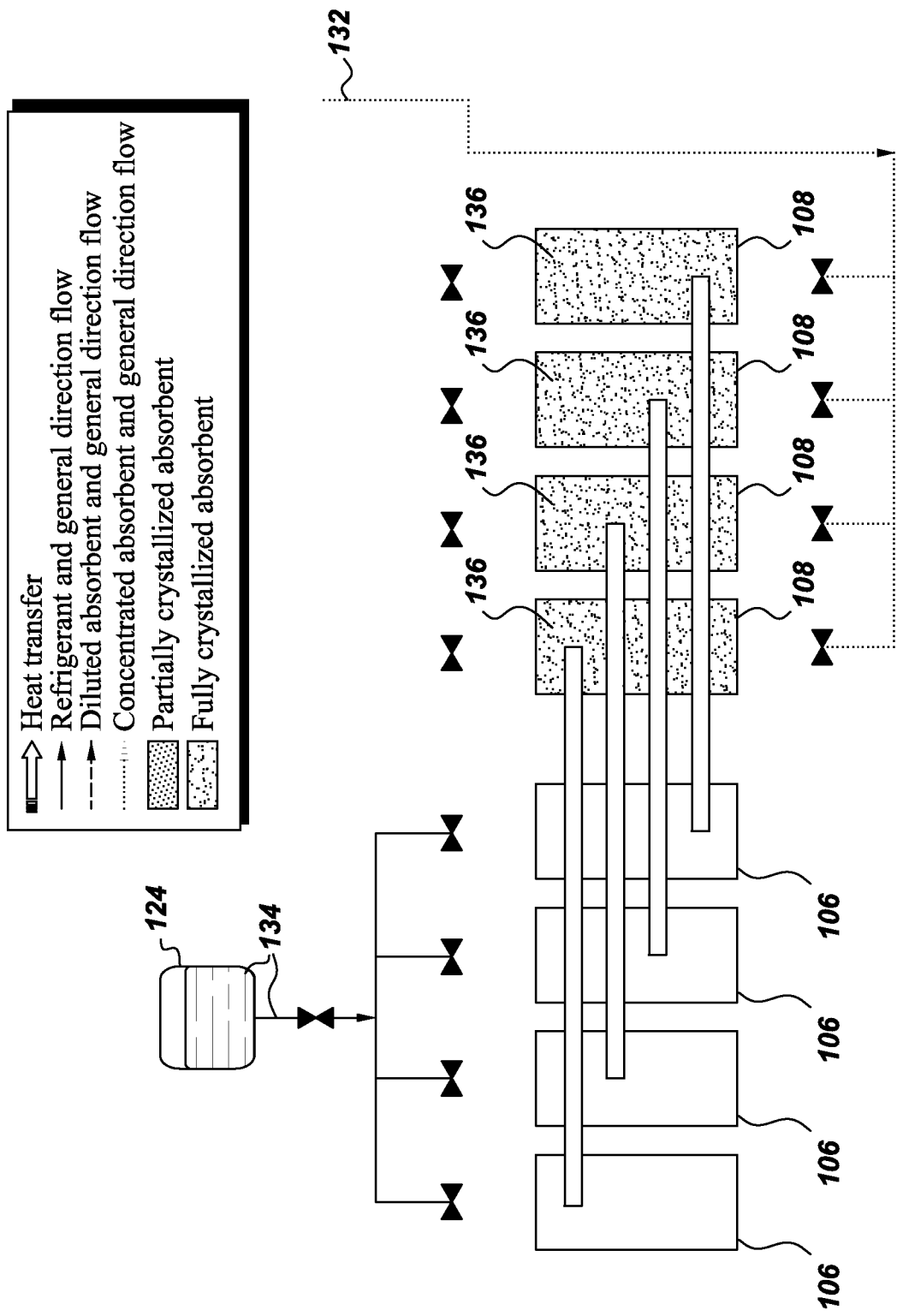
Figure 7:
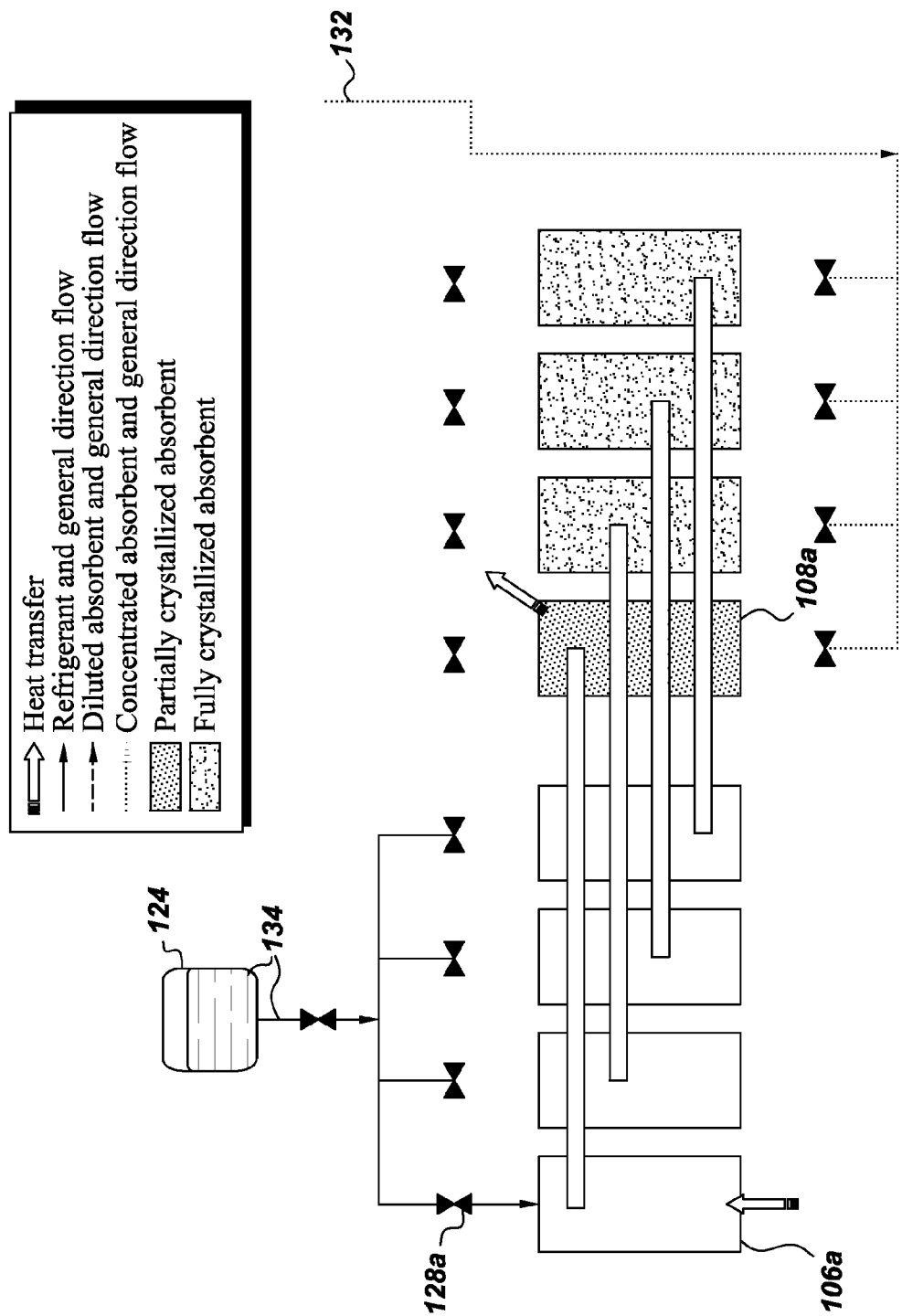
Figure 8:
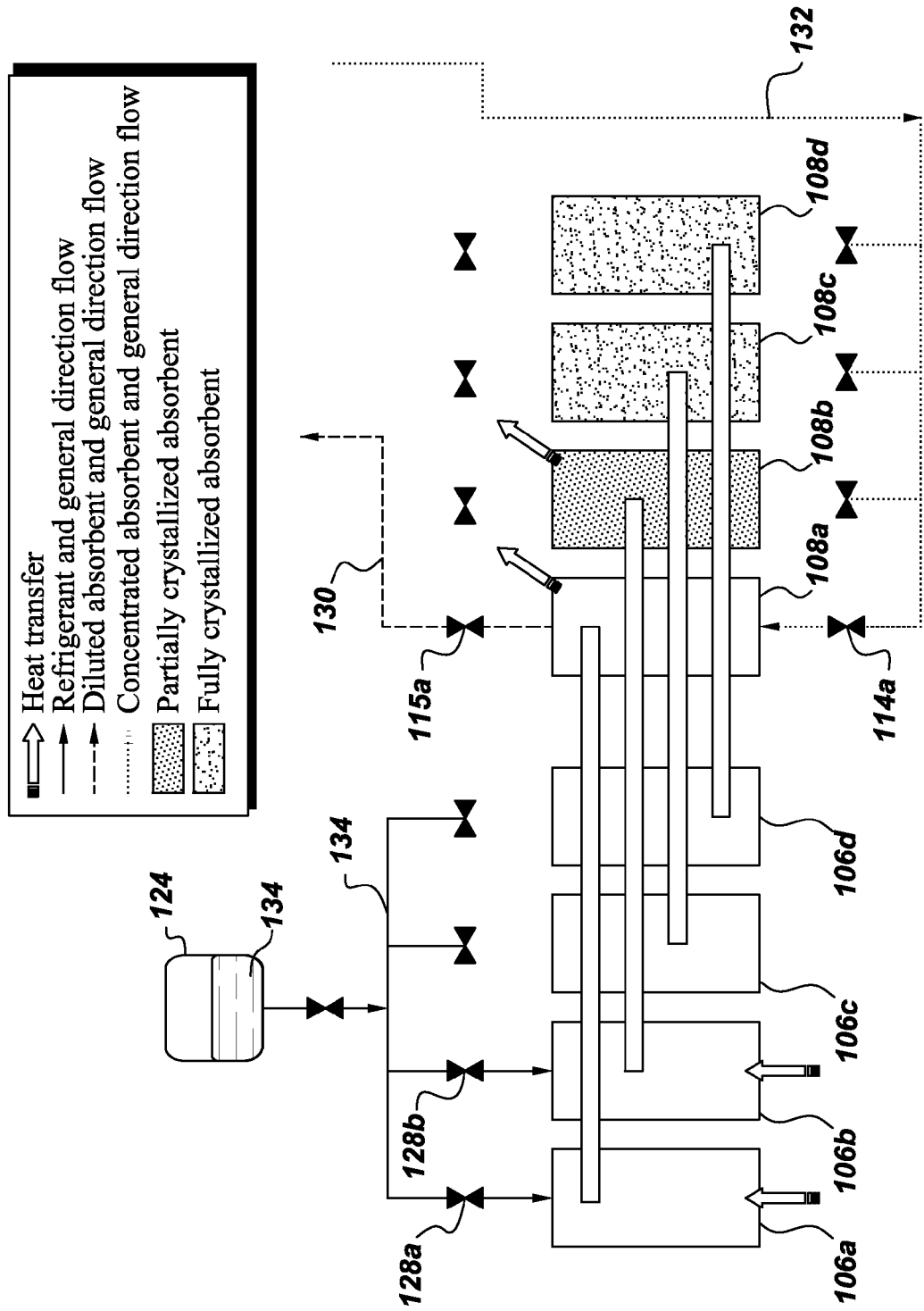

The above process can be continued, for example, until all of the evaporation and absorption chambers 106, 108 are operating in energy storage mode, that is, until the absorption chambers all contain crystallized absorbent (see FIG. 6). Thereafter, one of the valves 128, say, the valve 128a, can be opened to allow refrigerant to be evaporated in the first evaporation chamber 106a and provided to the first absorption chamber 108a (see FIG. 7). This introduction of evaporated refrigerant into the absorption chamber 108a can induce decrystallization of the crystallized absorbent in the absorption chamber, with the refrigerant changing from vapor to liquid and dissolving a portion of the crystallized absorbent. Through the evaporation-absorption/decrystallization process, thermal energy is transferred from the first evaporation chamber 106a to the first absorption chamber 108a. Some of this thermal energy may be rejected from the absorption chamber 108a to ambient, as discussed previously. However, some of the thermal energy can be absorbed by, and serve to raise the temperature of, the still crystallized absorbent in the absorption chamber 108a, which crystallized absorbent can have a relatively low temperature and a relatively high heat capacity. Still more of the thermal energy can be dissipated in breaking the bonds of the previously crystallized absorbent as the absorbent dissolves into the liquid refrigerant to form the absorbent-refrigerant solution 130. The valve 114a can also be opened to facilitate the flow of concentrated absorbent-refrigerant solution 132, and the valve 115a can be opened to facilitate the flow of diluted absorbent-refrigerant solution 130 out of the absorption chamber 108a. Thereafter, the first evaporation and absorption chambers 106a, 108a can again be seen to operate in heat-pumping mode.

At any time, the valves 114, 115, 128 can be opened to allow the evaporation and absorption chambers 106a-d, 108a-d to transition from operating in energy storage mode to operating in heat-pumping mode. For example, in some embodiments, once the first evaporation and absorption chambers 106a, 108a have transitioned from energy storage mode to heat-pumping mode, the valves 114b, 115b, 128b can be opened to transition the second evaporation and absorption chambers 106b, 108b. The remaining evaporation and absorption chambers 106c-d, 108c-d can be sequentially transitioned thereafter. In other embodiments, the evaporation and absorption chambers 106, 108 can all be transitioned together from energy storage mode to energy recovery mode to heat-pumping mode.

Thermal energy management systems consistent with the above-described system 100 may demonstrate enhanced performance relative to existing thermal energy management systems. For example, the thermal energy management system 100 may be operated in heat-pumping/energy storage mode during periods of lower ambient temperature (e.g., at night), thereby producing crystallized absorbent in one or more of the absorption chambers 108. During periods of higher ambient temperature (e.g., during the day), the absorbent in the absorption chambers 108 can be decrystallized, thereby facilitating the transfer of thermal energy from the evaporation chambers 106 to the absorption chambers with reduced requirement to reject thermal energy to ambient to continue the process. Instead, as discussed above, the thermal energy may be absorbed by the crystallized absorbent to raise the temperature and break solid bonds of the crystallized absorbent. Stored refrigerant and crystallized absorbent may, in some cases, be stored at ambient temperatures, thereby avoiding the need to expend energy to heat or cool these components.

Because the system 100 can be configured to allow crystallization of the absorbent in the absorption chambers 108, relatively high concentrations of absorbent in the absorbent-refrigerant solution 130, 132 (compared to existing absorption chillers) can be utilized while reducing concerns about system inoperability during heat-pumping due to unintended crystallization of the absorbent. This elevated absorbent concentration may be expected to improve the overall performance of the thermal energy management system 100 when operating in heat-pumping mode. Further, efficiency of the system 100 may be improved by the added energy storage capacity provided by the phase change associated with crystallization of the absorbent.

Figure 9:
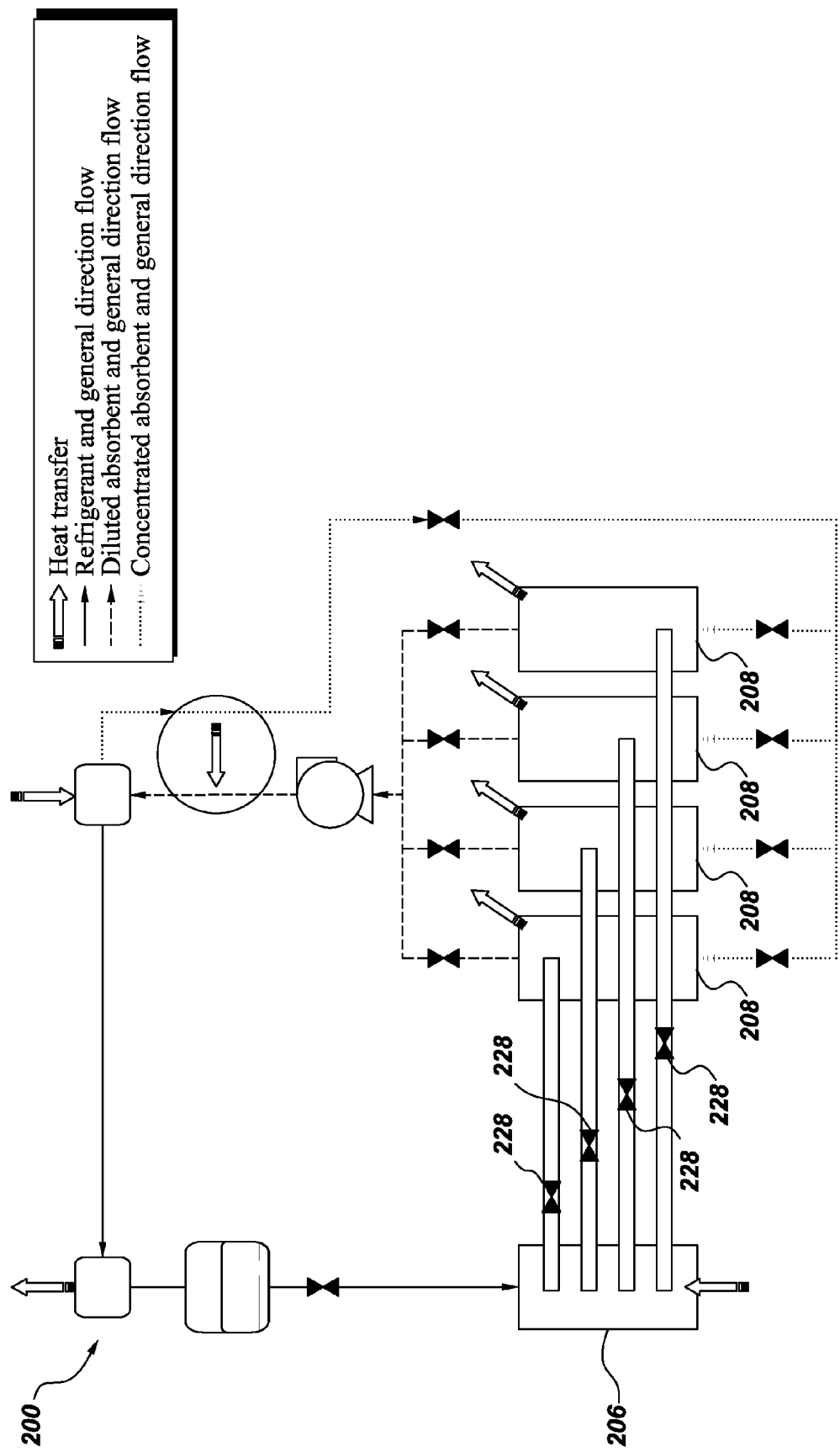
FIG. 9 is a schematic view of thermal energy management system configured in accordance with another example embodiment.

While only certain features of the invention have been illustrated and described herein, many modifications and changes will occur to those skilled in the art. For example, while thermal energy management systems have been described that incorporate an equal number of evaporation and absorption chambers, referring to FIG. 9, in some embodiments, the thermal energy management system 200 may include a single evaporation chamber 206 that is independently coupled to multiple absorption chambers 208. The flow of evaporated refrigerant to each of the absorption chambers 208 may then be independently controlled by opening and closing a series of valves 228. It is, therefore, to be understood that the appended claims are intended to cover all such modifications and changes as fall within the true spirit of the invention.

What is claimed:

1. A system comprising:
    an absorption module including at least two absorption chambers, each absorption chamber being configured to receive a liquid absorbent directly from a desorption module; and
    an evaporation module in independent selective fluid communication with each of said at least two absorption chambers, said evaporation module being configured to receive and cause therein evaporation of a refrigerant.

2. The system of claim 1, wherein said absorption module is configured such that at least one of said absorption chambers is configured to selectively receive the liquid absorbent while another of said absorption chambers is selectively prevented from receiving the liquid absorbent.

3. The system of claim 1, wherein said evaporation module includes multiple evaporation chambers, and wherein each of said absorption chambers is in selective independent fluid communication with a respective evaporation chamber.

4. The system of claim 1, wherein said absorption module is configured to receive the liquid absorbent that includes a material selected from a group consisting of LiBr, LiCl, $LiClO_3$, $CaCl_2$, $ZnCl_2$, HnBr, and $H_2SO_4$.

5. The system of claim 1, further comprising the desorption module configured to exchange the liquid absorbent with said absorption module and a condenser configured to receive the refrigerant from said desorption module and to output the refrigerant to be received by said evaporation module.

6. The system of claim 1, wherein said absorption chambers are configured to receive the liquid absorbent that includes at least a solution of the liquid absorbent and the refrigerant.

7. The system of claim 6, further comprising a refrigerant storage tank disposed in fluid communication between said evaporator module and a condenser and configured to store the refrigerant, wherein said evaporation and absorption modules are configured such that the refrigerant can flow from said evaporation module to a first of said absorption chambers to combine with the liquid absorbent while simultaneously flow of the refrigerant from said evaporation module to a second of said absorption chambers is prevented to cause crystallization of the liquid absorbent in said second of said absorption chambers and storage of a corresponding portion of the refrigerant in said refrigerant storage tank.

8. The system of claim 6, further comprising a refrigerant storage tank disposed in fluid communication between said evaporator module and a condenser and configured to store the refrigerant, wherein said evaporation and absorption modules are configured such that flow of the refrigerant from said evaporation module to one of said absorption chambers can be selectively prevented to cause crystallization of the liquid absorbent in said one of said absorption chambers and storage of a corresponding portion of the refrigerant in said refrigerant storage tank.

9. The system of claim 8, wherein said evaporation and absorption modules are configured such that flow of the refrigerant to said one of said absorption chambers can be selectively provided to cause the crystallized absorbent to decrystallize.

10. A method comprising:
    providing a system including an absorption module including at least two absorption chambers and an evaporation module in independent selective fluid communication with each of the absorption chambers;

flowing a liquid absorbent directly from a desorption module into the at least two absorption chambers;

evaporating a refrigerant in the evaporation module; and during a first interval, allowing the evaporated refrigerant to flow to a first of the absorption chambers while preventing the evaporated refrigerant from flowing to a second of the absorption chambers to cause the liquid absorbent to crystallize in the second of the absorption chambers.

11. The method of claim 10, further comprising allowing, during a second interval subsequent to the first interval, the evaporated refrigerant to flow to the second of the absorption chambers to cause the liquid absorbent to decrystallize.

12. A system comprising:

a liquid absorbent;

an absorption module including at least two absorption chambers, each absorption chamber being configured to receive said liquid absorbent directly from a desorption unit;

a refrigerant; and an evaporation module in independent selective fluid communication with each of said absorption chambers, said evaporation module being configured to receive and cause therein evaporation of said refrigerant.

13. The system of claim 12, wherein said absorption module is configured such that at least one of said absorption chambers is configured to selectively receive said liquid absorbent while another of said absorption chambers is selectively prevented from receiving said liquid absorbent.

14. The system of claim 12, wherein said evaporation module includes multiple evaporation chambers, and wherein each of said absorption chambers is in selective independent fluid communication with a respective evaporation chamber.

15. The system of claim 12, wherein said refrigerant includes water and said liquid absorbent includes a material selected from a group consisting of $LiBr$, $LiCl$, $LiClO_3$, $CaCl_2$, $ZnCl_2$, $HnBr$, and $H_2SO_4$.

16. The system of claim 12, further comprising the desorption module configured to exchange said liquid absorbent with said absorption module and a condenser configured to receive said refrigerant from said desorption module and to output the refrigerant to be received by said evaporation module.

17. The system of claim 12, wherein said liquid absorbent includes at least a solution of the liquid absorbent and said refrigerant.

18. The system of claim 17, wherein said evaporation module, said absorption module, and said liquid absorbent are configured such that said refrigerant flows from said evaporation module to a first of said absorption chambers to combine with said liquid absorbent while simultaneously flow of said refrigerant from said evaporation module to a second of said absorption chambers is prevented to cause crystallization of said liquid absorbent in said second of said absorption chambers and storage of a corresponding portion of said refrigerant in a refrigerant storage tank.

19. The system of claim 17, further comprising a refrigerant storage tank disposed in fluid communication between said evaporator module and a condenser, and configured for storing said refrigerant, wherein said evaporation module, said absorption module, and said liquid absorbent are configured such that flow of said refrigerant from said evaporation module to one of said absorption chambers is selectively prevented to cause crystallization of said liquid absorbent in said one of said absorption chambers and storage of a corresponding portion of said refrigerant in said refrigerant storage tank.

20. The system of claim 19, wherein said evaporation and absorption modules are configured such that flow of said refrigerant to said one of said absorption chambers can be selectively provided to cause said crystallized absorbent to decrystallize.

* * * * *